United States Patent [19]

Yanagisawa et al.

[11] Patent Number: 4,799,465
[45] Date of Patent: Jan. 24, 1989

[54] COMBUSTION CHAMBER FOR INTERNAL COMBUSTION ENGINES

[75] Inventors: Naoki Yanagisawa; Yoshihiko Sato, both of Fujisawa, Japan

[73] Assignee: Isuzu Motors Limited, Tokyo, Japan

[21] Appl. No.: 24,943

[22] Filed: Mar. 12, 1987

[30] Foreign Application Priority Data

Mar. 14, 1986 [JP] Japan .................................. 61-55090

[51] Int. Cl.$^4$ ............................................. F02B 19/08
[52] U.S. Cl. .................................... 123/256; 123/262; 123/276; 123/288
[58] Field of Search ............... 123/256, 276, 261, 262, 123/263, 288

[56] References Cited

U.S. PATENT DOCUMENTS

| | | | |
|---|---|---|---|
| 2,021,744 | 11/1935 | Perkins | 123/261 |
| 2,262,981 | 11/1941 | Weber | 123/261 |
| 2,975,773 | 3/1961 | Meurer | 123/276 |
| 3,945,351 | 3/1976 | Kimbara et al. | 123/276 |

FOREIGN PATENT DOCUMENTS

| | | | |
|---|---|---|---|
| 595387 | 3/1960 | Canada | 123/256 |
| 2064643 | 6/1981 | United Kingdom | 123/276 |

*Primary Examiner*—Andrew M. Dolinar
*Attorney, Agent, or Firm*—Cullen, Sloman, Cantor, Grauer, Scott & Rutherford

[57] ABSTRACT

According to the present ivention, a combustion chamber of internal combustion engines comprises: a main combustion chamber which is created by recessing the piston top; a swirl chamber which is contiguous to said main combustion chamber via a passage; and a fuel injection nozzle to supply atomized fuel into said main combustion chamber and swirl chamber. Because of the above arrangement, a relatively quick combustion takes place in the swirl chamber and a relatively sluggish combustion takes place in the main combustion chamber. As a result, the generation of HC, NOx, or smokes are suppressed while improving an output, a fuel consumption rate, and a thermal efficiency.

8 Claims, 6 Drawing Sheets

COMBUSTION CHAMBER FOR INTERNAL COMBUSTION ENGINES

TECHNICAL FIELD

The present invention relates to a combustion chamber for internal combustion engines in which fuel is injected directly into the combustion chamber in an atomized state. More particularly, the invention is concerned with a combustion chamber for internal combustion engines whose main combustion chamber formed in the piston communicates through a passage with a swirl chamber formed in the cylinder head.

BACKGROUND ART

Among combustion chambers of internal combustion engines which are designed to achieve a high efficiency combustion by directly injecting the fuel into the combustion chamber, there is a method known as the MAN-M method. In the MAN-M method, a main combustion chamber is formed by making a deep spherical recess in the piston top, and while generating a swirl therein, the fuel mist injected from the fuel injection nozzle is allowed to adhere to the inner walls of the main combustion chamber in the form of a liquid fuel film, and the surface evaporation rate of this fuel film is controlled by the swirl.

However, a problem exists with the MAN-M method in that a large amount of HC (hydrocarbons) and bluish white smoke are generated during starting-up at low temperature, such as when the environmental air temperature and the engine cooling water temperature are both low, or when idling while the combustion chamber wall temperature has not yet risen sufficiently. This is because, in the cases mentioned above, the amount of fuel vaporized for the combustion becomes small, and at the same time, the air-fuel mixture (called 'mixture' hereinafter) becomes very lean, since as the small quantity of the vaporized fuel is revolved around and carried by the swirl, dispersion of the mixture is assisted in the combustion chamber as a whole.

To solve the above problems, internal combustion engines described in the specifications of Japanese Patent Laid Open No. 85519/81 (called 'Proposal No. 1' hereinafter), Japanese Utility Model Laid Open No. 115515/81 (called 'Proposal No. 2' hereinafter), Japanese Utility Model Laid Open No. 172125/82 (called 'Proposal No. 3' hereinafter), and Japanese Utility Model Laid Open No. 33221/82 (called 'Proposal No. 4' hereinafter) have been proposed.

Figure 7:
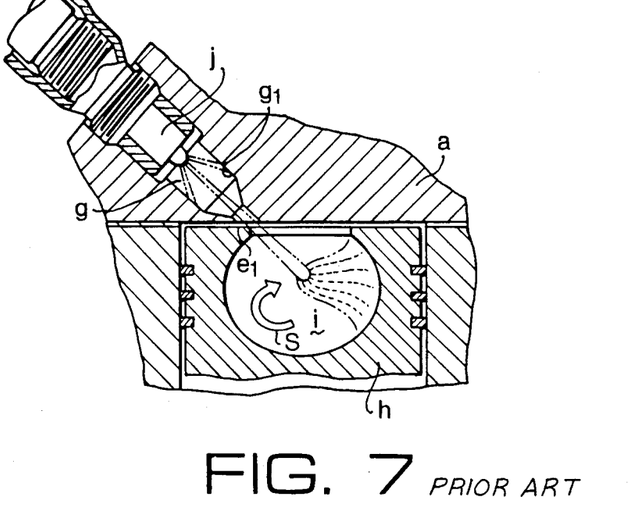
FIGS. 7-10 are schematic drawings illustrating various prior art combustion chambers and methods.

In Proposal No. 1, as shown in FIG. 7, there provided are an ignition chamber (g) in the cylinder head (a), and a main combustion chamber (i) in the piston (h), the two being in communication with each other by a passage ($e_1$), and a fuel injection nozzle (j) being disposed in an upper part of the ignition chamber (g) at the inner wall ($g_1$) thereof. From the fuel injection nozzle, fuel is injected toward the inner wall ($g_1$) of the ignition chamber (g) and the main combustion chamber (i) through the passage (e).

Figure 8:
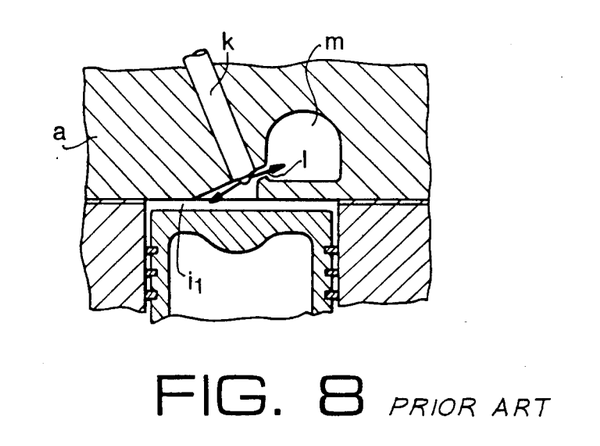

In Proposal No. 2, as shown in FIG. 8, a fuel injection nozzle (k) is provided on the side of the main combustion chamber ($i_1$) in such a way that most of the fuel injected from the fuel injection nozzle (k) will be sprayed into the subcombustion chamber (m) through the hole (l), on one hand, and to enlarge the cross section area of the injection passage that connects the subcombustion chamber (m) with the main combustion chamber ($i_1$), on the other hand.

Figure 9:
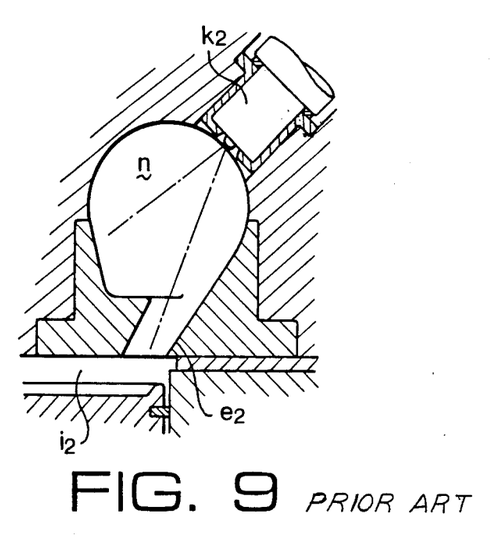

In Proposal No. 3, as shown in FIG. 9, a fuel injection nozzle ($k_1$) is disposed in an upper part of the swirl chamber (n), which communicates with the main combustion chamber ($i_2$) by the passage ($e_2$), in such a way that the fuel will be supplied not only to the swirl chamber (n) but also to the main combustion chamber ($i_2$).

Figure 10:
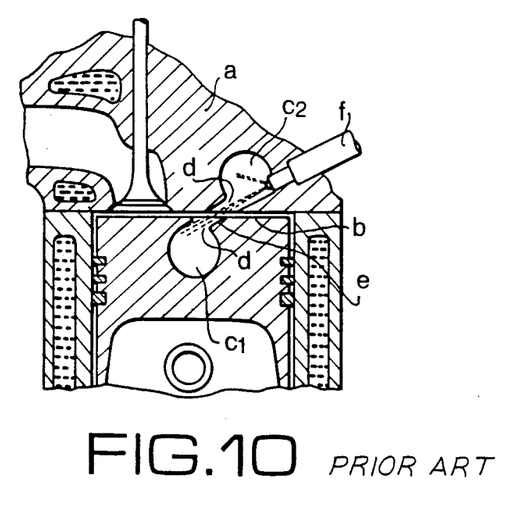

In Proposal No. 4, as shown in FIG. 10, the arrangement is to provide a pair of swirl chambers ($c_1$) and ($c_2$) in the cylinder head (a) and in the piston top (b), respectively, with their respective air intakes (d) facing each other over a connecting hole (e), in such a way that a part of the fuel mist from the fuel injection nozzle (f) will be injected into the swirl chamber ($c_1$), in the piston top (b) through the connecting hole (e), with the rest being injected into the swirl chamber ($c_2$) in the cylinder head (a).

In all of the proposals mentioned above, attempts are made to improve the combustion efficiency by optimizing the air-fuel ratio, i.e., the ratio in which the air that is heated to a high temperature by the compression action of the piston and the injected fuel are mixed. However, to supply the fuel to the main combustion chamber (i, $i_2$) through the connecting passage ($e_1$, $e_2$) as in Proposal No. 1 (FIG. 7) or in Proposal No. 3 (FIG. 9) does mean that the penetration power of the fuel mist, given thereto originally on injection, will be reduced by the flow of air generated in the compression stroke. Therefore, difficulties arise in such process, in that fuel is formed, vaporized, and combusted in the main combustion chamber (i, $i_2$).

Also, in Proposal Nos. 1 and 3, the chamber that generates and utilizes the swirl is limited to one side only. Therefore, these proposals do not improve the vaporization and the combustion by optimizing the air-fuel reaction (the ratio of air and fuel), and the resulting improvement is insufficient in terms of fuel consumption and output.

In Proposal No. 4, on the other hand, the construction arrangement in which the facing swirl chambers ($c_1$) and ($c_2$) which communicate with each other by the connection hole (e) simply doubles the throttling loss of the combustion air forced into the piston top, increases the thermal loss in the flow of the burnt gas into the piston top (b) and leads to deterioration of fuel consumption.

Also, to inject fuel into the swirl chamber ($c_1$) in the piston top (b) through the connection hole (e) is counterproductive to improvement of diffusivity of fuel mist (a property of the injected fuel mist is to disperse conically with respect to the direction of injection), resulting in reduction in the fuel mist penetration. There is a possibility, furthermore, that the fuel which is injected toward the swirl chamber ($c_1$) in the piston top (b) is burned in the connecting hole (e) by the combustion energy generated inside the swirl chamber (2) in the cylinder head (a). Therefore, Proposal No. 4 leaves much to be desired with regard to improving fuel consumption and output.

SUMMARY OF THE INVENTION

It is an object of the present invention to provide a combustion chamber for an internal combustion engine capable of reducing unburned matters such as HC, suppressing the noises generated by combustion, and improving the combustion efficiency, by controlling the amount of the mixture in accordance with the volume of the combustion chamber through promoting evaporation of the fuel supplied to the combustion chamber in the form of mist and mixing the vaporized fuel and air.

The objects set forth above are achieved by the following arrangement.

A main combustion chamber is formed in the top portion of the piston by recessing in the direction of the piston axis with the piston top surface as a reference plane. In the cylinder head, there is formed a swirl chamber having a volume which is small compared with that of the main combustion chamber. The main combustion chamber and the swirl chamber are in communication with each other by a passage that connects the two. This passage is formed in the cylinder head in such a way that the end port of the passage on the main combustion chamber side faces the main combustion chamber in the vicinity of the upper edge of the opening thereof. Further, in the passage there is provided a fuel injection nozzle means with its fuel-injecting nozzle part protruding in the passage interior on the main combustion chamber side thereof, the fuel injection nozzle means being disposed within and fixed inside aforesaid cylinder head. The fuel injection nozzle means is constructed so as to be capable of atomizing, then supplying the fuel by the fuel-injecting part into the swirl chamber through the passage on the one hand, and into the main combustion chamber on the other hand.

Due to this construction arrangement, the following effects are realized.

In the last stage of compression stroke, there is generated in the main combustion chamber a swirl flowing in the circumferential direction thereof, while in the swirl chamber a swirl flowing along the inner walls thereof is generated. In this last stage of the compression stroke, furthermore, fuel is injected in the form of a mist into the swirl chamber and also into the main combustion chamber from the fuel injection nozzel means.

The fuel mist supplied to the swirl chamber enters thereinto carried by the air that is forced thereinto, and evaporates as it revolves therein carried by the swirl. That part of the fuel that has been vaporized is mixed with the air in the swirl chamber to become the mixture, which is ignited and burnt. Here, since the volume of the swirl chamber is small compared with that of the main combustion chamber, and since the mixture is generated therein does not disperse into the main combustion chamber, a fuel-rich mixture is formed inside the swirl chamber.

Thus, even though a comparatively rapid combustion takes place in the swirl chamber, as the fire and the fire energy created upon the rapid combustion enter the main combustion chamber through the passage, not only is there no increase in the combustion noise that accompanies fast rise of combustion pressure, but, owing to the raised combustion temperature, HC are also decreased.

On the other hand, when the piston nears the top of the compression stroke, the fuel mist supplied from the fuel injection nozzle means into the main combustion chamber is evaporated by the heat of the compressed air in the main combustion chamber and by the heat from the chamber wall. Since formation of the mixture is assisted by the swirl, further, the mixture thus generated readily ignites and burns as the combusted gas flows in to lower the piston. The fuel supplied to the side wall of the main combustion chamber to form a fuel film thereat, on the other hand, vaporizes and burns gradually as the piston goes down.

Thus, sluggish combustion is made possible, whereby raising of output and thermal efficiency as well as combustion with outstanding combustibility are realized while suppressing generation of HC, bluish white smoke, and NOx.

BRIEF DESCRIPTION OF THE DRAWINGS

FIG. 5-(A), and FIG. 5-(B) are top views of main combustion chambers which have corner areas according to other embodiments of the present invention.

FIG. 6-(A), 6-(B), and 6-(C) are schematic views of main combustion chambers with shelves according to other embodiments of the present invention.

DESCRIPTION OF THE PREFERRED EMBODIMENTS

The preferred embodiments of the combustion chamber for internal combustion engines according to the present invention will now be discussed with reference to the attached drawings.

Figure 1:
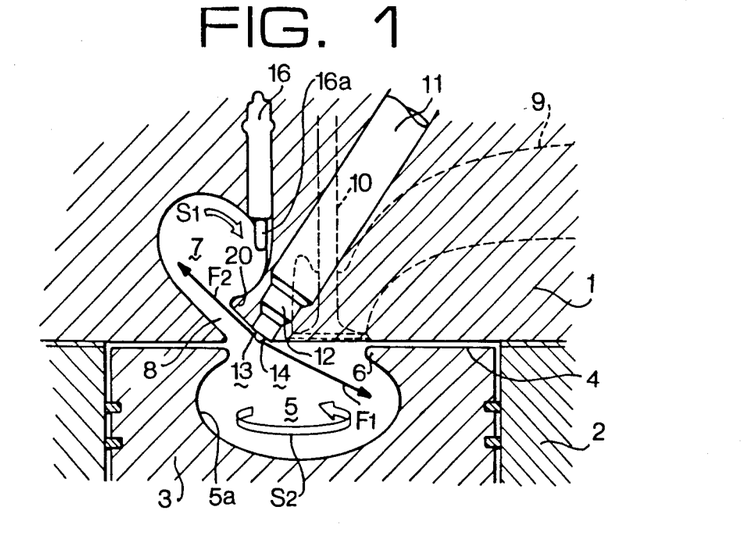
FIG. 1 is a schematic vertical sectional view of a preferred embodiment of a combustion chamber of the internal combustion engine according to the present invention.

In FIG. 1, the numeral 1 denotes a cylinder head, 2 the cylinder body, and 3 the piston. As shown therein, in the piston top 4 of the piston 3, there is formed a main combustion chamber 5, which is shaped by deeply recessing the piston top 4 in the axial direction in a firm of spherical cavity with the piston top surface 4 as the reference plane, in a manner such that the diameter of the opening is progressively enlarged forming a vertical section where, approximately a circle of the main combustion chamber 5 profile is cut at the top. As a consequence thereof, a lip part 6 is formed protruding radially and inwardly along the opening periphery in the upper portion of the opening of the main combustion chamber 5.

In the cylinder head 1, there is formed a swirl chamber 7 of a volume which is small compared with the main combustion chamber 5. In the lower portion of the swirl chamber 7, there is formed a passage 8 in a manner such as to face the main combustion chamber 5 in the vicinity of the lip part 6 thereof and to guide the air into the swirl chamber 7. Here, the axis of the passage 8 is offset with respect to the center of the swirl chamber 7, the passage 8 being connected to the swirl chamber 7 so as to generate a swirl S1 along the inner wall 7a of the swirl chamber 7. Due to this mentioned offset, a shelf 20 is created at the entrance of the swirl chamber 7, or at the downstream side of the passage 8, to encircle the air inside the chamber 7.

Figure 2:
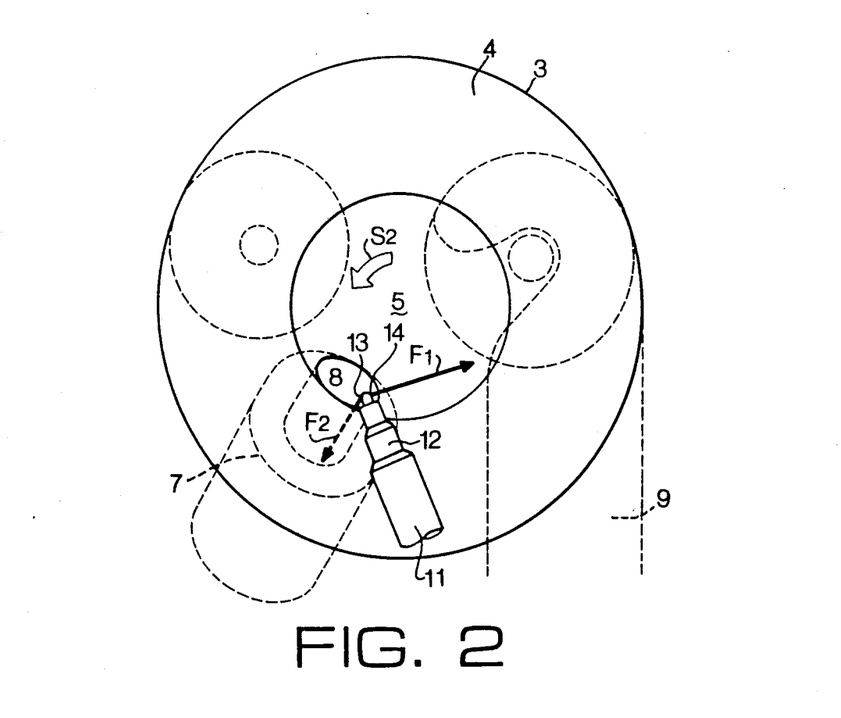
FIG. 2 is a top plan view of FIG. 1.

Also, inside the cylinder head 1, there is formed a helical swirl port 9 as shown in FIGS. 1 and 2 so as to feed the swirled air into the main combustion chamber 5. This swirl port 9 is opened or closed by a suction valve 10 that freely moves up and down inside the cylinder head 1.

Now, it must be remembered that one function of the combustion chamber of the internal combustion engine according to the present invention is to ensure a high efficiency combustion with regard to output and fuel consumption while suppressing the generation of HC and the bluish white fumes for all running conditions of the engine. For that purpose, a fuel injection nozzle means 11 is constructed and disposed in relation to the main combustion chamber 4 and the swirl chamber 7 as follows.

Figure 3:
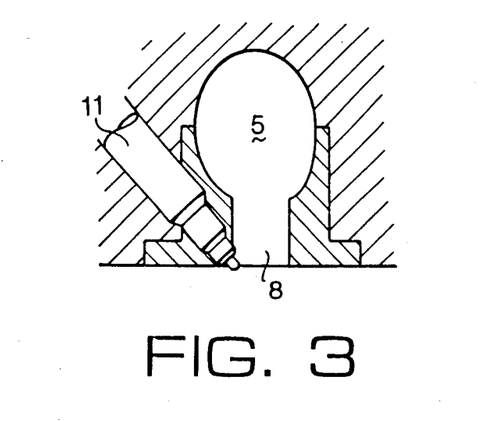
FIG. 3 is a detailed partial vertical sectional view of a swirl chamber.

As shown in FIG. 1 and FIG. 3, the fuel injection nozzle means 11 is constructed so as to enclose within its nozzle body 12 a needle valve (not shown), which is capable of free vertical motion with respect to the valve seat (not shown) in the nozzle body 12, to open a nozzle hole 13 in the vicinity of the valve seat, and to open nozzle hole 14, which is closed until the needle valve acquires a predetermined lift value but is opened when this lift value is exceeded, at the tip of the nozzle body 12. Furthermore, the fuel injection nozzle means 11 is disposed within the cylinder head 1 and contained in a nozzle holder (not shown) in a manner such that its nozzle holes find themselves in the upstream side of the passage 8. Here, the nozzle hole 13 faces the swirl chamber interior via the passage 8, whereas the nozzle hole 14 generally faces the side wall 5a of the main combustion chamber 5, and in the case of this particular embodiment, is directed toward the direction of the swirl S2. In the particular case of this embodiment, moreover, there provided within the cylinder head 1 is an ignition means 16, such as a glow plug, whose heating part 16a protrudes into the swirl chamber 7. The ignition means 16 may be selected to suit to the fuel used; for example, an ignition plug that is suited to low cetane number fuel oils or volatile fuel oils such as gasoline or alcohol may be employed.

The functions of the internal combustion engine combustion chamber of the present invention will now be explained with reference to the accompanying drawings.

During the start-up of the engine, while the needle valve lift is in a very low speed range, the needle valve of the fuel injection nozzle means 11 is activated in the lifting direction in accordance with the fuel pressure in the nozzle body 12. As the needle valve is lifted from the valve seat, the nozzle hole 13 is opened, and the fuel mist F2 is injected from the nozzle hole 13 into the swirl chamber 7, wherein the fuel mist F2 revolves around as it is carried by the compressed air that is forced into the swirl chamber 7, and the fuel mist F2 is quickly vaporized by the heat of the hot compressed air and mixes therewith.

Therefore, by controlling the amount of the fuel to be injected from the nozzle hole 13, a mixture of a fuel concentration appropriate for easy ignition and ready fire propagation, i.e., a mixture of proper air-fuel ratio, is formed within the swirl chamber 7 as the fuel mist F2 effectively mixes with the comprised air. The mixture of a proper composition thus formed is able to be burned quickly even during cold starting of the engine, when assisted, if necessary, by an ignition means 16 such as a glow plug or an ignition plug.

Under medium or heavy load conditions, on the other hand, when the lift value of the needle valve exceeds the predetermined value, the nozzle 14 is also opened, injecting the fuel mist F1 into the main combustion chamber 5. A portion of the fuel mist F1 thus injected impinges on the side wall 5a of the main combustion chamber 5 to be scattered away, while the rest forms a fuel films on the side wall 5 that flows therealong in the direction of the swirl S2, widening as it flows. Scattered fuel evaporates from its outer surface by the heat from the wall. As a consequence thereof, a mixture of a proper air-fuel ratio is formed in the main combustion chamber 5, too. This mixture is ignited instantly by the fire that is generated in the swirl chamber 7 by combustion and has flowed out into the main combustion chamber 5 through the passage 8, thereby performing combustion without misfiring, completing the combustion as the piston 3 is lowered.

Thus, because the stable combustion of the fuel is carried out for all the load conditions including starting-up of the engine, and because the combustion noises that are generated by abnormal combustion (due to an ignition lag or the like) and the maximum combustion temperature are decreased, the output, the thermal efficiency, and the fuel economy are also improved while suppressing generation of HC, bluish white smokes, and NOx. Also, since the formation of the main combustion chamber 5 and the swirl chamber 7 with intervening passage 8 is effective to control the movement of the mixture after fuel injection, it provides the function of maintaining a correct air-fuel ratio by preventing the injected fuel from dispersing into the main combustion chamber 5 from the swirl chamber 7.

Moreover, by making the nozzle hole 13 that faces the swirl chamber 7 an auxiliary nozzle hole having a very small diameter, thus making the diameters of the fuel mist particles created by the nozzle hole 13 very small, the evaporation and combustion can be further promoted. This is particularly effective for improving the ease of cold start-up and the stability of combustion.

The nozzle hole 14 that faces the main combustion chamber 5 need not necessarily be oriented in the direction of the swirl S2, but may be oriented in the counter flow direction so as to promote the evaporation of the fuel. Also, a plurality of nozzle holes 14 may be provided each at a predetermined injection angle. In this case, the injection directions are preferably not toward the center of the main combustion chamber 5. It prevents abnormal combustion occurring at the combustion chamber center, and suppresses the generation of NOx which are due to the convergence of the swirl S2 at the center of the combustion chamber 5 and the hot air created thereat.

Figure 5A:
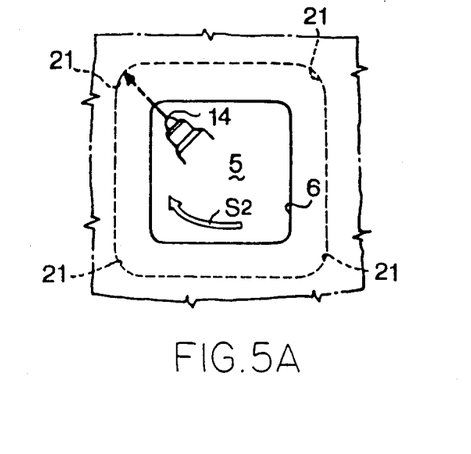
Figure 5B:
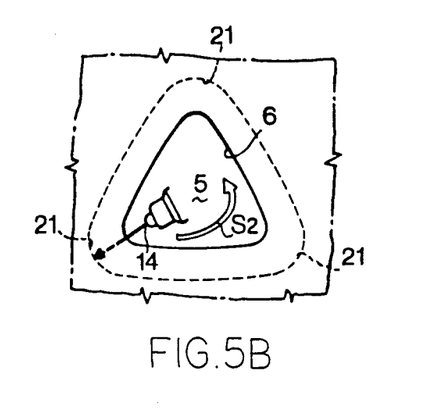
Figure 6A:
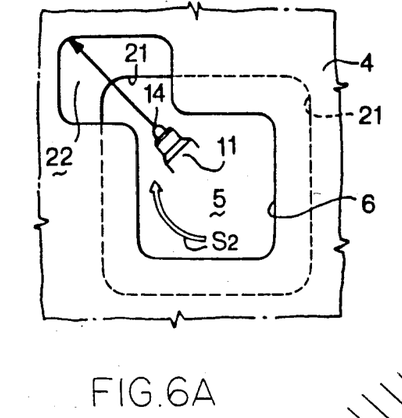
Figure 6B:
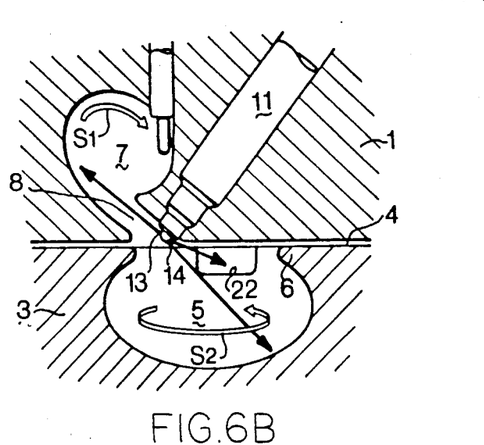
Figure 6C:
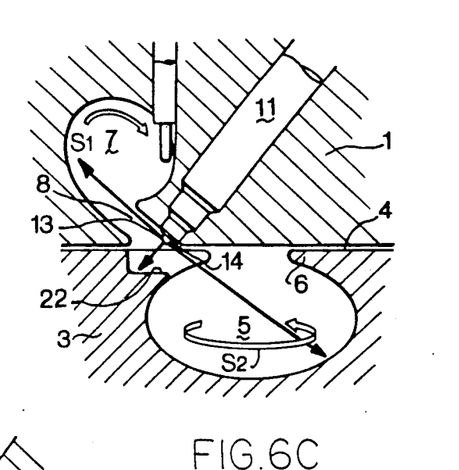

Finally, in explaining embodiments of the internal combustion engine combustion chamber according to the present invention, the form of the main combustion chamber 5 thereof has been described as circular in horizontal section, but polygonal forms such as squares or triangles, which have corner areas 21, are also permissible as shown in FIG. 5-(A), and (B). In these embodiments, the number of the nozzle holes 14 of the fuel injection nozzle means 11 is more than one, and at least one of them is directed toward one of the corner areas 21. FIG. 6-(A), (B), or (C) show an embodiment which contains a shelf 22 at the upper part of the opening of the main combustion chamber 5.

As illustrated in FIG. 6-(A), at the top of one of the corner areas 21 of the main combustion chamber 5, there is provided a shelf 22. The shelf 22 is contiguous with the main combustion chamber 5, and also has an opening as shown in FIG. 6-(B).

One of the nozzle holes 14 of the fuel injection means 11 is directed toward the shelf 22 to supply the fuel in an atomized state. Although the shelf 22 can be located anywhere in the wall, its location should be decided with regard to the penetrability of the fuel from the nozzle holes 14 in a manner such that a fuel-rich mixture is formed inside the shelf 32.

Further, in order to effectively improve the propagation of the flame and the flame energy through the passage 8, as shown in FIG. 6-(C), the shelf 22 is provided so as to face the passage 8 at the end of the compression stroke. In this particular case, one of the nozzle holes 14 which is oriented to the shelf is designed to be small with regard to the atomization of the fuel. It may be appreciated that there are more nozzle holes provided in these embodiments than the previously mentioned ones.

As described above, a fuel-rich mixture is locally formed by providing the corner areas 21 and shelves 22, which help the stability of combustion. Similar effects may be obtained in the swirl chamber 7 by forming a shelf in the inner wall thereof so as to assist the formation of the swirl.

Figure 4:
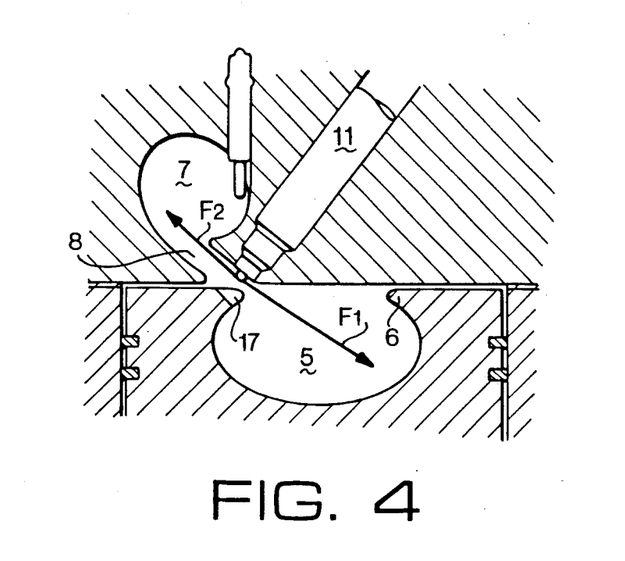
FIG. 4 is a schematic sectional view of another embodiment according to the present invention.

Furthermore, as shown in FIG. 4, a notch groove 17 may be formed in the piston top 4 so as to communicate with the main combustion chamber 5, and the inlet port of the passage 8 may be located above the notch groove 17.

As explained above, the combustion chamber for internal combustion engines of the present invention provides effective controlling of the air-fuel ratio to the proper value by improving the mixing of fuel and air as they are supplied to the main combustion chamber and to the auxiliary chamber, this achieving stabilized start-up performance, stable evaporation of fuel, and slowed combustion.

We claim:

1. A combustion chamber for an internal combustion engine, comprising:
   a main combustion chamber defined by a recess in the top of a piston of the engine, said main combustion chamber being formed with its opening diameter progressively enlarged downwards in the axial direction of said main combustion chamber, and a lip part formed along the periphery of the opening of said main combustion chamber, said lip part protruding radially and inwardly;
   a swirl chamber formed inside a cylinder head of the engine;
   a passage for connecting said main combustion chamber with said swirl chamber, said passage being defined in said cylinder head and having a wall portion tangentially aligned with a portion of the wall of the swirl chamber corresponding to the upstream end of said swirl chamber such that the compressed air introduced into said swirl chamber is substantially directed along said wall of said swirl chamber to swirl therein, said passage having a longitudinal axis generally directed to the central portion of said main combustion chamber; and
   a fuel injection nozzle means for supplying fuel mist into said swirl chamber through said passage as well as into said main combustion chamber, said fuel injection nozzle means directing fuel mist into said swirl chamber substantially parallel to said tangential wall portion such that said fuel mist is carried by said compressed air directed along said tangential wall and revovled with said swirl chamber.

2. The combustion chamber according to claim 1, wherein the swirl chamber is formed so as to create a shelf part in the lower inner wall thereof so as to provide a means for creating a swirl that flows along the inner wall of said swirl chamber.

3. The combustion chamber according to the claim 1, wherein the passage that connects the main combustion chamber with the swirl chamber is arranged to have its main combustion chamber side port facing the main combustion chamber in the vicinity of the upper edge of the opening thereof, and to have the fuel injection nozzle means facing the interior of said passage in the vicinity of the main combustion chamber side port thereof so that the fuel injection nozzle means supplies fuel mist into the swirl chamber along with air being introduced into the swirl chamber through said passage and into the main combustion chamber without substantial interference therewith by air flowing through said passage toward said swirl chamber.

4. The combustion chamber according to claim 1, wherein the fuel injection means possesses a nozzle hole that atomizes and injects the fuel into the swirl chamber through the passage and a nozzle hole that atomizes and injects the fuel into the main combustion chamber.

5. The combustion chamber according to claim 3, wherein the fuel injection means possesses a nozzle hole that atomizes and injects the fuel into the swirl chamber through the passage and a nozzle hole that atomizes and injects the fuel into the main combustion chamber.

6. The combustion chamber according to claim 3, wherein said fuel injection nozzle means is directed so as to inject the fuel into said swirl chamber, toward the inner wall of the main combustion chamber, and also in the same direction the swirl flows.

7. The combustion chamber according to claim 1, wherein the swirl chamber is formed with a volume which is small compared to the volume of the main combustion chamber.

8. A combustion chamber for an internal combustion engine, comprising:
   a main combustion chamber defined by a recess in the top of a piston of the engine, said main combustion chamber being formed with its opening diameter progressively enlarged downwards in the axial direction of said axial combustion chamber, and a lip part formed along the periphery of the opening of said main combustion chamber, said lip part protruding radially and inwardly;
   a swirl chamber formed inside a cylinder head of the engine;
   a passage for connecting said main combustion chamber with said swirl chamber, said passage being defined in said cylinder head with said passage having a longitudinal axis directed generally to the central portion of said main combustion chamber;
   a nozzle means for supplying fuel mist into said swirl chamber through said passage as well as into said main combustion chamber.

* * * * *